Nov. 11, 1969  A. J. BING  3,477,387
LOAD-SUPPORTING APPARATUS
Filed May 18, 1967  4 Sheets-Sheet 1

INVENTOR
A. J. BING
BY
Cameron, Kerkam & Sutton
ATTORNEYS

Nov. 11, 1969  A. J. BING  3,477,387
LOAD-SUPPORTING APPARATUS
Filed May 18, 1967  4 Sheets-Sheet 2

INVENTOR
A. J. BING
BY
Cameron, Kerkam & Sutton
ATTORNEYS

Nov. 11, 1969    A. J. BING    3,477,387
LOAD-SUPPORTING APPARATUS
Filed May 18, 1967    4 Sheets-Sheet 3
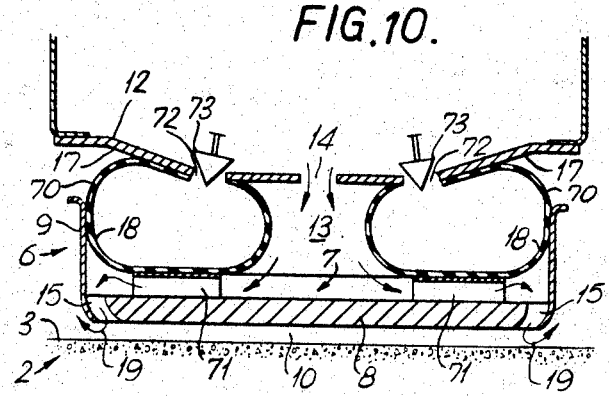
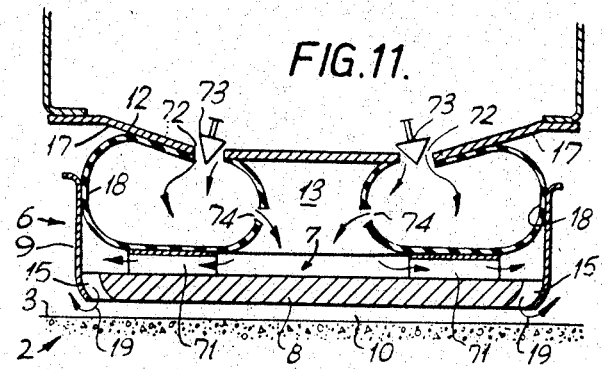
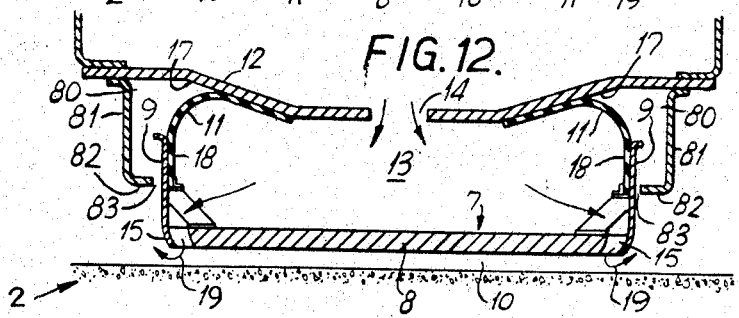
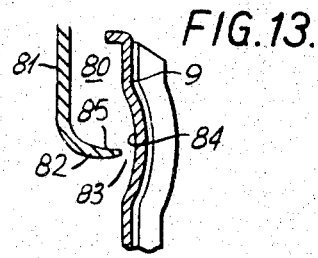 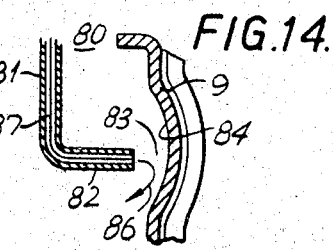
INVENTOR
A. J. BING
BY
Cameron, Kerkam & Sutton
ATTORNEYS

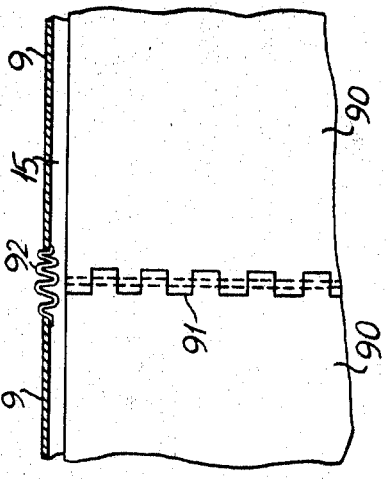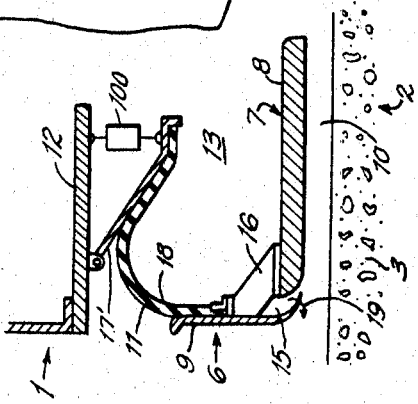

United States Patent Office 3,477,387
Patented Nov. 11, 1969

3,477,387
LOAD-SUPPORTING APPARATUS
Alan John Bing, Lyndhurst, England, assignor to Hovercraft Development Limited, London, England, a British company
Filed May 18, 1967, Ser. No. 639,488
Claims priority, application Great Britain, May 27, 1966, 23,783/66; Mar. 9, 1967, 11,082/67
Int. Cl. B60v *3/04;* A63g *1/08;* B61b *13/08*
U.S. Cl. 104—23     12 Claims

ABSTRACT OF THE DISCLOSURE

Load-supporting apparatus suitable for use as a two-stage suspension system for a track-guided air-cushion vehicle comprises a base connected, by means of a flexible membrane, to a load-accepting member so as to define a flexible chamber.

The base is perforated by a peripheral nozzle arrangement through which some of the pressurized air supplied to the chamber flows to form and contain a load-carrying air cushion. The air cushion forms the lower stage of the suspension system and the chamber the upper stage of the system.

The base carries an upstanding flange and the load-accepting member has a specially-shaped surface so that, as due to the inevitable track irregularities, the base moves up and down relative to the track, the flexible membrane progressively engages with both the flange of the base and the surface of the load-accepting member whereby the "stiffness" of the system is varied.

This invention relates to load-supporting apparatus in which a load is at least partly supported by a cushion of pressurized gas formed and contained between the apparatus and a supporting surface (for example a prepared track) or between the apparatus and the load.

It is an object of this invention to provide load-supporting apparatus which at least partly absorbs and resists movements of the surface or the load towards the apparatus, and therefore acts as a suspension.

The present invention provides load-supporting apparatus for at least partly supporting a load out of contact with a supporting surface by means of a cushion of pressurized gas and comprising a cushion member and a load member, flexible wall means connecting the cushion member to the load member so as to form a chamber, chamber inlet means for supplying pressurized gas to the chamber and chamber outlet means for allowing some of said gas to flow from the chamber to the side of the cushion member remote from the chamber so as to at least assist in forming a load-supporting cushion of pressurized gas between the cushion member and one of said supporting surfaces and the load, said cushion member and said load member each having at least one bearing surface with which said flexible wall means can engage in such a manner that movement of the cushion member towards the load member results in simultaneous progressively increasing engagement of the flexible wall means with each of said bearing surfaces so as to provide increasing resistance to said movement.

The arrangement provides a two-stage suspension system for a passenger-carrying gas-cushion vehicle wherein, in the interests of passenger comfort, movement of the vehicle body, caused by irregularities in the surface over which the vehicle travels, is kept to a readily acceptable level. Furthermore, the arrangement provides a gas-cushion suspension system wherein the cushion height can be kept small (for example, 0.85 inch) so that a substantial saving in gas-supply power can be made.

The bearing surfaces of both the cushion member and the load member may overlap at least during movement of the former towards the latter and may be orientated so that laterally-directed forces applied by pressurized gas within the chamber are substantially in equilibrium.

Preferably the bearing surface of one member is inclined to the horizontal and the bearing surface of the other member is substantially vertical.

Damping means may be provided so as to vary the suspension characteristics of the apparatus.

Embodiments of the present invention will now be described by way of example with reference to the accompanying diagrammatic drawings of which:

Figure 1:
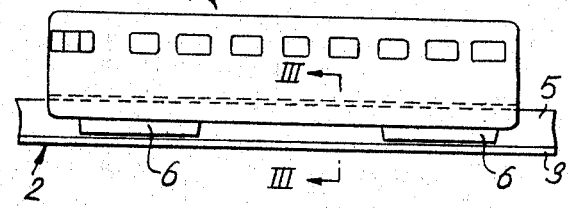
FIGURE 1 is a side view of a track-located gas-cushion vehicle.
Figure 2:
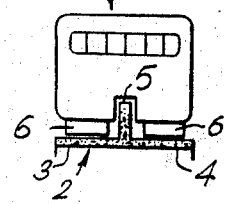
FIGURE 2 is a front view of the vehicle.
Figure 3:
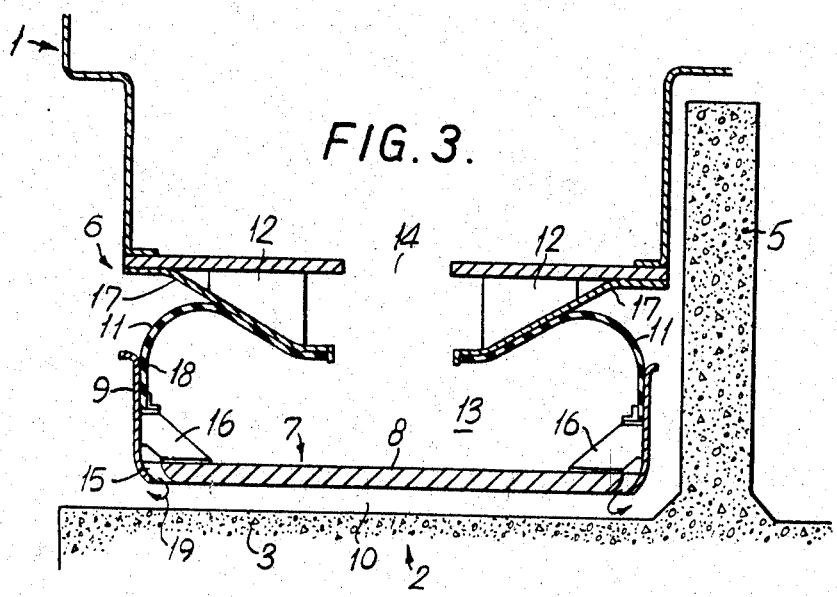

FIGURE 3 is a section, on an enlarged scale, taken on the lines III—III of FIGURE 1, FIGURES 4 to 9 are fragmental views which illustrate various modifications of the arrangement illustrated in FIGURE 3, FIGURES 10, 11 and 12 are sectional side views of differing modifications of the arrangements illustrated in FIGURES 1 to 9, FIGURE 13 and 14 are fragmentary sectional views showing further modifications of the arrangements illustrated in FIGURES 1 to 12, FIGURE 15 is a sectional side view of a further modification applicable to any of the arrangements illustrated in FIGURES 1 to 14, FIGURE 16 is a fragmentary plan view of the modification shown in FIGURE 15, and FIGURE 17 is a fragmentary sectional side view of a modification of the arrangement illustrated in FIGURE 3.

Referring to the accompanying drawings, a track-located gas-cushion vehicle 1 travels on a concrete rail 2 with a cross-section of inverted T-shape, the rail 2 having two horizontal portions 3, 4 and a vertical portion 5. The vehicle 1, which is passenger-carrying, has four load-supporting apparatus in the form of air-cushion suspension units 6, two of these being adjacent one end of the vehicle 1 on opposite sides of the vertical rail portion 5 and the other two units 6 being adjacent the opposite end of the vehicle 1 on opposite sides of the vertical portion 5. The vehicle 1 is supported by cushions 10 of air formed between the units 6 and the horizontal rail portions 3, 4 and is propelled along the rail 2 by linear motor means as described for example in U.S. Patent No. 3,356,041.

Each unit 6 has a rigid cushion (contacting) member 7 including a flat base 8 of oblong form and a peripheral, upstanding wall 9. A flexible wall 11, which may be elastic but is preferably inextensible, is connected at its lower end to the inner surface of the wall 9 at a position below the top thereof, and is connected at its upper end to the bottom of a load (carrying) member 12 of annular form secured to the body of the vehicle 1. The flexible wall 11 thus movably connects the cushion member 7 to the load member 12. The cushion member 7, flexible wall 11 and load member 12 form a plenum chamber 13 with an inlet 14 through which air under pressure is supplied from an air compressor (not shown) mounted in the body of the vehicle. The base 8 of the cushion member 7 is perforated by a peripheral, inwardly-inclined nozzle or slot 15 which forms an outlet from the chamber 13. Struts 16 secure the wall 9 to the base 8. The lower surface 17 of the load member 12 has a slightly curved shape which inclines generally to the horizontal. The inner surface 18 of the wall 9 is vertically disposed. Thus, both surfaces 17, 18 have vertical components of dimension. The surfaces 17 and 18 serve as bearing surfaces with which the flexible wall 11 can engage in such a manner that, as explained hereinafter, movement of the cushion member 7 towards the load member 12 results in simultaneous progressively increasing engagement of the flexible wall 11 with each of the bearing surfaces 17, 18 so as to provide increasing resistance to said movement.

In use, air under pressure is supplied through the inlet 14 of each unit 6 to pressurize the chamber 13. Some of the air then flows from the chamber 13 through the slot 15 in the form of an annular air curtain 19 which initially forms and thereafter contains the air cushion 10, a cushion 10 being formed on the lower side of each cushion member 7. The lower side of a cushion member 7 thus forms the upper boundary of a cushion 10 and the curtain 19 the lateral boundary thereof.

Under normal operating conditions, the outer surface of the flexible wall 11 engages the inner surface 18 of the wall 9 and the surface 17 of the load member 12 in the manner shown in FIGURE 3 with the unconstrained portion of the flexible wall 11, i.e. that portion free of contact with the surfaces 17, 18, having a part-circular shape of large radius. Should the vehicle 1 encouter a bump in the rail 2, cushion pressure will rise and force the cushion member 7 upwardly. This will cause further engagement of the flexible wall 11 with both the surface 17 and the wall 9 and consequently provide an increasing resistance to upward movement of the cushion member 7. The unconstrained portion of the wall 1 then takes up a part-circular shape of small radius. If the vehicle 1 encounters a depression in the rail 2, the resulting fall in cushion pressure will allow the cushion member 7 to move downwardly to "follow" the rail 2. Thus, a lesser amount of the flexible wall 11 will engage with the surface 17 and the wall 9 and there will therefore be correspondingly less resistance to upward movement of the cushion member 7.

The units 6, besides providing the cushions of air to support the vehicle, also act as two-stage suspension systems in that small vertical undulations of the rail 2 are substantially accommodated by the cushions 10 and large undulations by the chamber 13. Thus, any consequent vertical movement of the body of the vehicle 1 is reduced to a level acceptable to the passengers.

The shapes and orientations of the surface 17 and the wall 9 provide the units 6 with suspension characteristics which result in a comfortable ride for the passengers in the vehicle 1. Most of the variation in resistance to upward movement of the cushion member 7 is due to the inclination of the surface 17 as it will be appreciated that as the flexible wall 11 progressively engages with the surface 17 the effective area over which pressure within the chamber 13 acts is considerably enlarged to provide a progressively increasing "stiffness."

As the cushion member 7 moves up and down relative to the load member 12, because the wall 9 of the cushion member 7 surrounds the load member 12, and because they overlap each other, there is a tendency for the laterally-directed forces applied by pressurised air in the chamber 13 to be substantially in equilibrium. This is an advantage as lateral movement of the cushion member 7 is undesirable, varying as it does the "stiffness" of the suspension system.

If desired, the wall 9 could be inwardly or outwardly inclined instead of vertically, as shown in FIGURE 3.

Figure 4:
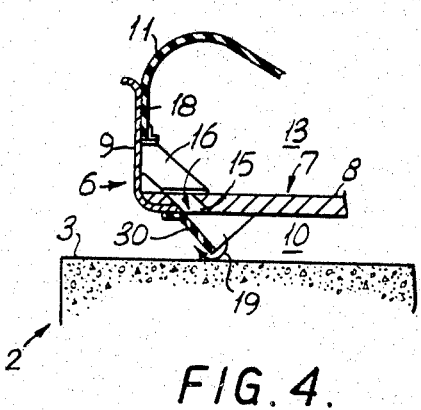

As shown in FIGURE 4, a flexible skirt 30 may be attached to the base 8 so as to hang therefrom and assist the curtain 19 in containing the cushion 10. The skirt 30 is of the form disclosed in British Patent No. 1,043,351. The base 8 may have a central orifice in addition to the slot 15.

Figure 5:
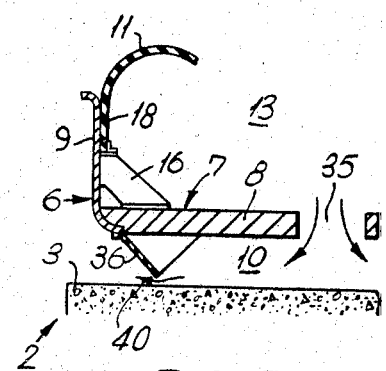

With reference to FIGURE 5, a "plenum" cushion system may be provided by replacing the annular slot 15 by a central aperture 35 and by disposing a flexible skirt 36 around the periphery of the base 8. The skirt 36 has a form which has also been disclosed in British Patent No. 1,043,351 and depends downwardly to almost contact the top horizontal surface of the track portion 3 so as to wholly contain the cushion beneath the base 8. Air surplus to cushion-forming requirements escapes to the atmosphere through a small annular gap between the bottom of the skirt 36 and the adjacent surface of the track portion 3, as indicated by the arrow 40.

FIGURES 6 to 9 illustrate further "plenum chamber" cushion arrangements wherein the cushion is contained by various alternative forms of rigid or flexible wall structures of annular form depending from the periphery of the base member 8. The choice of the alternatives will depend on the effect required to be "built into" the suspension system.

Figure 6:
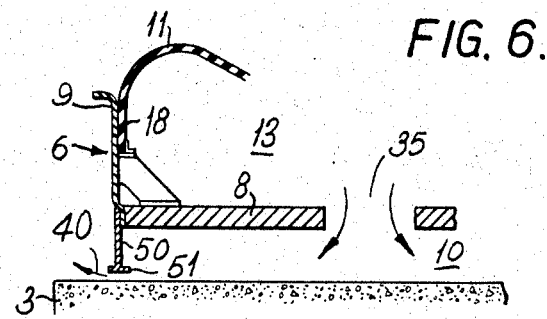

FIGURE 6 shows an arrangement using a rigid wall structure 50 which carries a horizontally-disposed flange 51 on its bottom edge. That portion of the bottom surface of the flange 51 which extends outwardly from the cushion 10 is acted upon by the pressure of atmosphere-seeking air escaping from the cushion and this tends to keep the bottom of the wall structure 50 clear of the rail 2.

Figure 7:
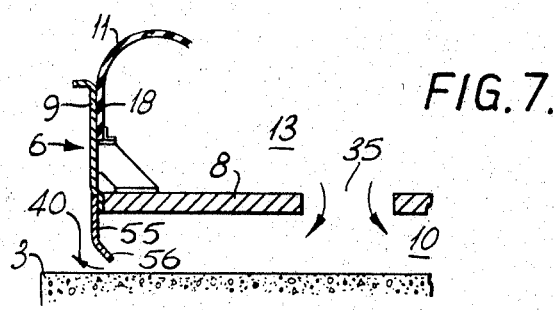

FIGURE 7 shows an arrangement using a rigid wall structure 55 with an inwardly-inclined lower portion 56. Cushion pressure acting on the inwardly-inclined portion creates a downwardly-acting component of force which tends to urge the wall structure 55 towards the rail 2.

Figure 8:
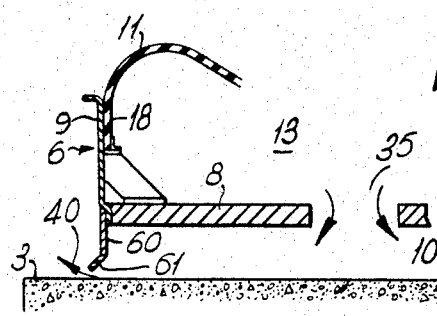

FIGURE 8 shows an arrangement using a rigid wall structure 60 with an outwardly-inclined lower portion 61. The lower portion 61 has an effect similar to but rather less than the flange 51 of FIGURE 6.

Figure 9:
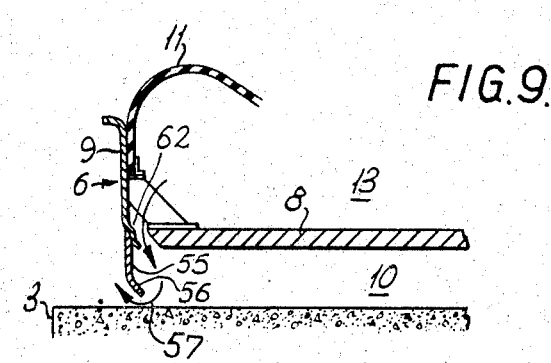

FIGURE 9 shows an arrangement which differs from that shown in FIGURE 7 in that the central aperture 35 of the latter is replaced by a peripheral slot 62. This arrangement results in a flow of air being set up over the inner surface of the wall structure 55 so as to leave the lower, inwardly-inclined portion 56 thereof in the form of an air curtain 57. The air curtain assists the wall structure 55 to contain the cushion.

With reference now to FIGURE 10, an inflated member 70 of annular form is located between the surface 17 and spacers 71 attached to the upper surface of the base 8. The top of the member 70 is attached to the surface 17 and the side of the member 70 to the inner surface of the wall 9. The inflated member 70 thus replaces the flexible wall 11 of FIGURES 3 to 9 and the member 12, inflatable member 70 and the cushion member 7 form the chamber 13. It will also be noted that in this modification the surface 17 is flat and not curved.

The interior of the inflatable member 70 is in communication, through apertures 72 formed in the surface 17, with a source of air under pressure, which source may or may not be the same source as that supplying air to the chamber 13. The size of each aperture 72 is controlled by an adjustable needle valve 73.

In use, air under pressure is supplied through the apertures 72 to inflate the inflatable member 70. Relative movement between the cushion member 7 and the load member 12 causes changes in volume of the inflatable member 70 with resultant passage of air through the apertures 72. Thus, upward movement of the cushion member 7 compresses the inflated member 70 so that air is expelled from the member 70 and downward movement of the cushion member 7 expands the inflatable member 70 so that air enters the inflatable member 70 by way of the apertures 72.

Thus, the suspension characteristics of the load-supporting unit 6 now not only depend upon the shape of the surface 17 and the wall 9 but also upon the size of each of the apertures 72 which can be varied by adjustment of the valves 73.

In the further modification shown in FIGURE 11, the inlet 14 has been omitted and air is supplied to the chamber 13 by way of the inflatable member 70 and ports 74 formed in the side thereof.

FIGURE 12 is a further modification of the arrangement of FIGURE 3 and shows a damping chamber 80 of annular form defined by the outer surface of the wall 9 and the inner surface of a further wall 81 spaced from and surrounding the wall 9 in telescopic relationship. The wall 81 is attached to and depends vertically from the underside of the load member 12 and has an inward projection 82 at its lower end which is spaced by an annular gap 83 from the wall 9. The gap 83 connects the chamber 80 with the ambient atmosphere.

In use, relative movement between the cushion member 7 and the load member 12 causes the volume of the chamber 80 to vary so that air is expelled from or drawn into the chamber by way of the gap 83. This action varies the suspension characteristics of the apparatus in a manner similar to that achieved by the arrangement of FIGURE 10.

FIGURE 13 shows how the projection 82 and the wall 9 can be shaped to vary the cross-sectional area of the gap 83 during relative movement between the walls 9 and 81 and thereby vary the suspension characteristics of the apparatus in a predetermined manner. The wall 9 has been given an annular concavity 84 which defines a passageway connecting the chamber 80 with atmosphere and the projection 82 has been given a sharp edge 85 which acts as a valve. In the position shown in FIGURE 13 the gap 83 is at its largest as any vertical movement of the wall 9 will reduce the gap. Thus, as the cushion member 7 is moved up and down whereby the volume of the chamber 80 is reduced and increased respectively, the flow of air to atmosphere is restricted to dampen this movement.

In FIGURE 14, passage of air through the gap 83 is controlled by an air jet or curtain 86 issuing from an annular nozzle 87 formed in the end of the projection 82. Air for the curtain is supplied through a passage 88 formed in the wall 81 and projection 82. The concavity 84 has been retained but can be dispensed with if desired.

In a non-illustrated modification of the arrangement of FIGURE 14, the concavity 84 is replaced by a convexity which causes the air curtain 86 to "switch" up and down. Thus, upward movement of the curtain 86 results in the space 80 being supplied with curtain air and downward movement of the curtain tends to evacuate the space 80 both of which occurrences tend to assist damping.

The previously-described embodiments of this application may be modified by making the cushion member 7 of articulated form. FIGURES 15 and 16 illustrate such a modification and show the base 8 of the cushion member 7 comprising several sections 90 interconnected at adjacent ends by pivotal connections 91. The axes of the pivotal connections 91 are transverse to the direction of travel of the vehicle. As shown in FIGURE 16 the wall 9 is made in sections adjacent sections being flexibly connected in an air-tight manner by flexible seals 92.

In use, if the surface 3 of the track 2 is uneven, relative movement between the cushion member 7 and the body member 12 occurs with the flexible wall 11 engaging the inclined surface 17 and wall 9 to a greater or less extent. Because the base of the member 7 is formed in sections 90, it can conform more accurately to the contour of the surface 3 than a rigid base member could and this enables a more stable, constant thickness air cushion to be maintained between the cushion member 7 and the track surface 3.

In a non-illustrated modification of the arrangement of FIGURES 15 and 16, for stability purposes the ends of the intermediate sections 90 are perforated by slots extending substantially parallel to the connections 91, whereby air is discharged from the plenum chamber 13 to form air curtains dividing the cushion 10 into a plurality of cushion compartments.

In any of the above-described arrangements each unit 6 may include a light tension spring between the load member 12 and the cushion member 7 to cause retraction of the cushion member 7 when the air supply is cut off. Also, in some circumstances, the cushion member 7 may be guided in its movement relative to the load member 12 by means additional to the guiding forces provided by the flexible wall 11, for example, by a pivoted linkage or relatively slidable guides. To cater for load and other variations, means may be provided so as to make the orientation of the surface 17 or the wall 9 variable. For example, either manually by load-sensing means in the unit or by sensing means at the front of the vehicle to sense rail undulations. Thus, the load member 12 and/or the wall 9 could be pivotally connected to the body of the vehicle and the base 8 respectively, a fluid-operated jack or jacks being provided to effect angular variation. For example, as shown in FIGURE 17 the inclined bearing surface 17' is pivotally connected to the vehicle body and a hydraulic jack 100 is provided for raising and lowering the end of the inclined surface remote from the pivot. It will be appreciated that the closer to the horizontal the surface 17 is orientated the greater the resistance offered to movement of the cushion member 7 towards the load member 12.

Units similar to the units 6 may be used, when turned through 90°, to co-operate with the vertical rail portion 5 so as to guide the vehicle 1 laterally.

The units 6 can be utilised for carrying heavy objects over uneven or soft ground. They can also be used in an inverted sense with the cushion formed between the cushion member 7 and the load, for example, as a support for a conveyor belt or other strip material, such as sheet metal, plastics or glass in a rolling mill. Thus, in this arrangement, the cushion member 7 will be disposed above the load member 12.

It should be appreciated that, where possible, any of the above described modifications can be used in combination. For example, the modifications of FIGURES 4 to 9 and FIGURES 15 to 16 can be used either singly or in combination with any of the arrangements of the remaining figures. Similarly, either of the modifications of FIGURES 10 and 11 may be used on any of the arrangements of the remaining figures.

I claim:

1. Load-supporting apparatus for at least partly supporting a load out of contact with a supporting surface by means of a cushion of pressurised gas and comprising a cushion member and a load member, flexible wall means connecting the cushion member to the load member so as to form a chamber, chamber inlet means for supplying pressurised gas to the chamber, and chamber outlet means for allowing some of said gas to flow from the chamber to the side of the cushion member remote from the chamber so as to at least assist in forming a load-supporting cushion of pressurised gas between the cushion member and said supporting surface, said load member having a bearing surface inclined to the horizontal with which said flexible wall means can engage in such a manner that movement of the cushion member towards the load member results in progressively increasing engagement by the flexible wall means with said inclined bearing surface so as to provide increasing resistance to said movement.

2. Apparatus as claimed in claim 1 wherein the cushion member has a bearing surface with which said flexible wall means progressively engages when the cushion member moves towards the load member.

3. Apparatus as claimed in claim 2 wherein the bearing surfaces of said cushion member and said load member overlap (as seen in side view) at least during said movement of the cushion member towards the load member.

4. Apparatus as claimed in claim 2 wherein the bearing surface of the cushion member is substantially vertical.

5. Apparatus as claimed in claim 1 wherein the chamber outlet means comprise an annular nozzle from which gas flowing from the chamber issues in the form of a gas curtain.

6. Apparatus as claimed in claim 1 wherein the load-supporting gas cushion is contained for at least part of its periphery by a wall structure attached to and depending from the cushion member.

7. Apparatus as claimed in claim 6 wherein the wall structure has an inwardly-inclined lower portion.

8. Apparatus as claimed in claim 6 wherein the wall structure has an outwardly-extending lower portion.

9. Apparatus as claimed in claim 1 provided with damping means whereby movement of the cushion member towards the load member is damped.

10. A vehicle for operation on a prepared track comprising a plurality of load-supporting apparatus as claimed in claim 1 for supporting the vehicle on the track, and means for guiding the vehicle relative to the track.

11. Apparatus as claimed in claim 1 wherein the cushion member is rigid.

12. Apparatus as claimed in claim 1 including means for varying the angle of inclination of said inclined bearing surface.

References Cited

UNITED STATES PATENTS

| | | | |
|---|---|---|---|
| 3,096,728 | 7/1963 | Amann | 104—134 |
| 3,139,947 | 7/1964 | Beardsley | 180—128 |
| 3,373,697 | 3/1968 | Hartje | 104—23 |

ARTHUR L. LA POINT, Primary Examiner

CHARLES B. LYON, Assistant Examiner

U.S. Cl. X.R.

104—134